(12) United States Patent
Ebran et al.

(10) Patent No.: US 11,661,635 B2
(45) Date of Patent: May 30, 2023

(54) FRUCTOSE PURIFICATION METHOD (71) Applicant: NOVASEP PROCESS SOLUTIONS, Saint-Maurice-de-Beynost (FR)

(72) Inventors: Teddy Ebran, Pont de Chéruy (FR); Guillaume Thibault, Genas (FR)

(73) Assignee: NOVASEP PROCESS SOLUTIONS, Saint-Maurice-de-Beynost (FR)

( * ) Notice: Subject to any disclaimer, the term of this patent is extended or adjusted under 35 U.S.C. 154(b) by 104 days.

(21) Appl. No.: 17/047,681

(22) PCT Filed: Apr. 22, 2019

(86) PCT No.: PCT/EP2019/060254
§ 371 (c)(1),
(2) Date: Oct. 14, 2020

(87) PCT Pub. No.: WO2019/206841
PCT Pub. Date: Oct. 31, 2019

(65) Prior Publication Data
US 2021/0102266 A1   Apr. 8, 2021

(30) Foreign Application Priority Data

Apr. 23, 2018  (EP) .................................... 18305504

(51) Int. Cl.
*C13K 11/00* (2006.01)
*B01D 15/18* (2006.01)
(Continued)

(52) U.S. Cl.
CPC .......... *C13K 11/00* (2013.01); *B01D 15/1871* (2013.01); *B01D 15/361* (2013.01);
(Continued)

(58) Field of Classification Search
CPC ........ C13K 11/00; C13K 1/00; B01D 15/185; B01D 15/1821; B01D 15/00; B01D 15/08; B01D 15/22; B01D 15/265
(Continued)

(56) References Cited

U.S. PATENT DOCUMENTS 4,366,060 A * 12/1982 Leiser .................. B01D 15/362
  210/659
4,373,025 A   2/1983 Neuzil et al.
(Continued)

FOREIGN PATENT DOCUMENTS

CN   101668867 A   3/2010
CN   201801525 U   4/2011
(Continued)

OTHER PUBLICATIONS

International Search Report and Written Opinion for Int'l Application No. PCT/EP2019/060254, entitled "Fructose Purification Method", 13 pages, dated Jul. 11, 2019.
(Continued)

*Primary Examiner* — Coris Fung
*Assistant Examiner* — Ritu S Shirali
(74) *Attorney, Agent, or Firm* — Hamilton, Brook, Smith & Reynolds, P.C.

(57) ABSTRACT

A method for purifying a mixture in a multicolumn chromatography system. The method successively and cyclically collects a raffinate, injects the mixture to be separated, collects an extract, and injects eluent. The mixture to be separated contains fructose and has a dry matter mass concentration of 45 to 55%. The method is carried out at a temperature of 50 to 62° C.

16 Claims, 2 Drawing Sheets

(51) Int. Cl.
*B01D 15/42* (2006.01)
*C13K 1/00* (2006.01)
*C13K 3/00* (2006.01)
*B01D 15/36* (2006.01)

(52) U.S. Cl.
CPC .............. *B01D 15/424* (2013.01); *C13K 1/00* (2013.01); *C13K 3/00* (2013.01)

(58) Field of Classification Search
USPC .......................................................... 127/30
See application file for complete search history.

(56) References Cited

U.S. PATENT DOCUMENTS

| | | | |
|---|---|---|---|
| 5,221,478 | A | 6/1993 | Dhingra et al. |
| 5,234,503 | A | 8/1993 | Lillard, Jr. et al. |
| 9,441,280 | B2 * | 9/2016 | Pease ..................... B01J 39/26 |
| 2006/0273013 | A1 * | 12/2006 | Chin ................... B01D 53/047 210/659 |
| 2017/0304745 | A1 | 10/2017 | Binder et al. |

FOREIGN PATENT DOCUMENTS

| | | |
|---|---|---|
| CN | 102876758 A | 1/2013 |
| CN | 103060482 A | 4/2013 |
| CN | 104630312 A | 5/2015 |
| CN | 204625637 U | 9/2015 |
| CN | 105177087 A | 12/2015 |
| CN | 210826190 U | 6/2020 |
| FR | 2 668 775 A1 | 5/1992 |
| WO | WO-9207097 A1 * | 4/1992 ........... B01D 15/185 |
| WO | WO 03/016577 A1 | 2/2003 |
| WO | WO 2014/030030 A1 | 2/2014 |
| WO | 2015/104464 A1 | 7/2015 |
| WO | 2016061037 A1 | 4/2016 |
| WO | WO 2016/061037 A1 | 4/2016 |

OTHER PUBLICATIONS

Chinese First Office Action, Appl. No 201810871420.5, dated Mar. 15, 2022 (with English translation of Chinese First Office Action).
International Preliminary Report on Patentability for Int'l Application No. PCT/EP2019/060254, titled: "Fructose Purification Method," 12 pages, dated Oct. 27, 2020 (with English Translation of Written Opinion).
Chromatographic Methods, Modeling, Simulation and Design, by Roger Marc Nicoud, Cambridge University Press, 2015, p. 530-531.
Silva et al., "Effect of Dead Volumes on the Performance of an Industrial-Scale Simulated Moving-Bed Parex Unit for p-Xylene Purification," AIChE Journal, Jan. 2016, vol. 62, No. 1, 15 pages.
Notification of the First Office Action, issued for Chinese Application No. 201810870145.5, entitled "Method for Producing Fructose from Glucose," dated Oct. 14, 2022.

\* cited by examiner

FRUCTOSE PURIFICATION METHOD

This application is the U.S. National Stage of International Application No. PCT/EP2019/060254, filed on Apr. 22, 2019, which designates the U.S., published in French, and claims priority under 35 U.S.C. § 119 or 365(c) to European Application No. 18305504.5, filed on Apr. 23, 2018. The entire teachings of the above applications are incorporated herein by reference.

SCOPE OF THE INVENTION

The present invention relates to a method for purifying a fructose composition, as well as to a method for producing a fructose composition from an initial composition comprising glucose using this purification method.

TECHNICAL BACKGROUND

In the food industry, there is a significant use of fructose-based compositions especially known under the designation HFS for "High Fructose Syrup". In particular, under the designation HFS 55 is known a composition comprising about 55% by mass of fructose relative to the total dry matter, and under the designation HFS 95 is known a composition comprising at least 95% by mass of fructose relative to the total dry matter.

It is known to manufacture the compositions HFS 55 and HFS 95 by isomerization from a glucose-based composition. Traditionally, the manufacturing method includes a first evaporation to concentrate the glucose-based composition, then an isomerization step, then another evaporation to carry out a second concentration, then a chromatographic purification making it possible to separate a fructose-enriched flow from a glucose-enriched flow, and another evaporation to carry out a third concentration from the fructose-enriched flow.

This method requires a relatively heavy installation and involves significant energy consumption.

There is thus a need to produce fructose-based compositions, such as the composition HFS 55 or the composition HFS 95 with greater efficiency (and for example with lower energy consumption) and/or with reduced chromatography column dimensions.

SUMMARY OF THE INVENTION

According to a first object, the invention relates to a method for purifying a mixture to be separated containing fructose in a multicolumn chromatography system, the method comprising successively and cyclically:
  a step of collecting a raffinate, a step of injecting the mixture to be separated,
  a step of collecting an extract and a step of injecting eluent;
wherein the mixture to be separated has a dry matter mass concentration of 45 to 55%, the method being carried out at a temperature of 50 to 62° C.

In some embodiments, the mixture to be separated has a dry mass concentration of from 48 to 52%, preferably about 50%.

In some embodiments, the method is implemented at a temperature of 55 to 60° C.

In some embodiments, the extract contains a mass proportion of fructose, relative to the total dry matter, greater than or equal to 95%, preferably greater than or equal to 98%.

In some embodiments, the mixture to be separated contains glucose, and preferably comprises:
  a mass proportion of glucose relative to the total dry matter from 40 to 65%, preferably from 45 to 60%, more preferably from 50 to 55%; and/or
  a mass proportion of fructose relative to the total dry matter from 30 to 55%, preferably from 35 to 50%, more preferably from 40 to 45%.

In some embodiments, at least 90% by mass of the fructose contained in the mixture to be separated is recovered in the extract.

In some embodiments, the mixture to be separated comprises polysaccharides, wherein at least 70%, preferably at least 80% by mass of the polysaccharides contained in the mixture to be separated are recovered in the raffinate.

In some embodiments, the multicolumn chromatography system comprises from 4 to 6 cells; and/or comprises columns having a length of 1.0 to 2.6 m, preferably 1.4 to 2.0 m.

In some embodiments:
  the injected volume of eluent is from 0.12 to 0.22 BV; and/or
  the injected volume of mixture to be separated is from 0.13 to 0.40 BV.

In some embodiments, the multicolumn chromatography system comprises a plurality of columns and intercolumn fluidic links, and the velocity of the fluids in the intercolumn fluidic links is greater than 0.5 m/s, preferably greater than 1 m/s and more preferably greater than 1.5 m/s.

In some embodiments, the multicolumn chromatography system comprises a plurality of columns and intercolumn fluidic links, and the volume of the intercolumn fluidic links is less than 10%, preferably less than 5% and preferably less than 3% of the volume of the columns.

In embodiments, the multicolumn chromatography system comprises a zone 4 situated between a collection line of raffinate and an injection line of eluent, the zone 4 comprising a volume of mobile phase less than 0.56 BV, preferably less than 0.54 BV.

The object of the invention is also a method for producing a fructose composition comprising the following successive steps:
  supply of an initial composition;
  hydrolysis, isomerization, concentration by evaporation and/or demineralization of the initial composition to obtain an intermediate composition;
  purification of the intermediate composition as a mixture to be separated according to the method described above, making it possible to obtain a glucose-rich raffinate and a fructose-rich extract;
  concentration of the extract by evaporation of water.

In some embodiments, the method further comprises a step of removing residual color from the extract prior to the concentration step of the extract, preferably by ion exchange resin and/or by activated carbon as well as preferably, a sterile filtration step.

In some embodiments, the raffinate is recycled and added to the initial composition prior to the concentration step of the initial composition.

In some embodiments:
  the initial composition has a dry matter mass concentration of 25 to 35%, preferably about 31%; and/or
  the concentrated initial composition has a dry matter mass concentration greater than or equal to 40%; and/or
  the intermediate composition comprises at least 40% by mass of fructose relative to the total dry matter; and/or the produced fructose composition has a dry matter mass concentration greater than or equal to 75%, preferably about 77%.

In some embodiments:

the produced fructose composition contains a mass proportion of fructose, relative to the total dry matter, greater than or equal to 95%, preferably greater than or equal to 98%.

In some embodiments, the method comprises injecting water as an eluent in the purification step, the ratio of mass flow rate of eluent to mass flow of dry matter of produced fructose composition being from 0.5 to 1.3, preferably from 0.6 to 1.2.

In some embodiments, the method comprises a step of removing polysaccharides contained in the raffinate by nanofiltration or chromatographic purification, followed by recycling the raffinate towards the initial composition. The present invention makes it possible to meet the need expressed in the prior art. It more particularly provides a method for the production of a fructose-based composition, such as an HFS 55 or an HFS 95 composition, more effectively, and notably with a better yield.

The invention is based on the observation that fructose tends to degrade during chromatographic purification, especially since the temperature is high and the dry matter mass concentration of the mixture to be separated is high. This degradation of fructose impairs the efficiency of the method, especially when a high degree of purity in fructose is desired, because obtaining this degree of purity requires a relatively long residence time in the chromatographic system.

In particular, it has been discovered that the phenomenon of fructose degradation increases significantly at a temperature above 62° C. The invention thus provides a purification at a temperature of less than or equal to 62° C.

In general, in an industrial separation method, the custom is to operate at the highest possible concentration for the mixture to be separated. Reference is made in this regard to *Chromatographic Methods, Modeling, Simulation and Design*, by Roger Marc Nicoud, Cambridge University Press, 2015, p. 530-531. It is explained in this work that the concentration of the feedstock must be as high as possible, a high limit of this concentration being associated with risks of miscibility or too much pressure in the column.

In contrast to customary use, the present invention allows for optimum purification, by working at an optimal or quasi-optimal concentration considering the fructose degradation (i.e. working within a highest possible concentration range, without however observing a significant degradation of fructose).

The invention therefore makes it possible to reduce the volume of eluent consumed (and therefore the energy consumption), and/or to reduce the volume of stationary phase used, and/or to increase the volume of feedstock to be treated, and/or to reduce the size of the chromatographic columns, and, if necessary, with a more compact and less expensive production facility.

DESCRIPTION OF EMBODIMENTS OF THE INVENTION

The invention is now described in more detail and without limitation in the description which follows.

Chromatographic Purification

The chromatographic purification of the invention is carried out in an assembly of several chromatography columns containing a stationary phase, with successively and cyclically, in a given part of the system:

a step of collecting a raffinate, a step of injecting the mixture to be separated, a step of collecting an extract and an eluent injection step.

The various steps above follow one another temporally in one part of the system. The part of the system in question is preferably located between the outlet of one column and the inlet of the next column. Alternatively, the part of the system in question may include a column or part of a column.

At a given instant, one or more of the above steps may be simultaneously implemented in one or more parts of the system. For example, all of these steps may be simultaneously implemented in respective parts of the system.

The "mixture to be separated" or "feedstock" or "feedstock to be treated" is the mixture containing a product of interest (in this case fructose) and at least one impurity which is subjected to the chromatographic purification. The purification is meant to enrich a fraction (the extract or raffinate) in said product of interest.

By "raffinate" is meant the fraction obtained by elution which contains the species relatively least retained by the stationary phase, and therefore whose elution is the fastest.

By "extract" is meant the fraction obtained by elution which contains the species relatively most retained by the stationary phase, and therefore whose elution is the slowest.

By "enriched" fraction in a species A and "depleted" in a species B is meant that the ratio of species A/species B molar concentrations in the fraction is greater than that of the input flow of the chromatographic purification (independently of the effects of concentration or overall dilution).

The eluent is a fluid injected to displace the species retained by the stationary phase. In the invention, the eluent used is preferably an aqueous solution, or water.

By "mobile phase" is meant the fluid that displaces in the columns of the system. Depending on its position, each column is traversed by a mobile phase volume as a function of the zone in which the column is located, wherein this volume may be different from the volume of eluent which is injected into one or the other of the columns. In the case of a multicolumn method with identified zones between the input and output lines (as described in more detail below), the term "mobile phase volume" designates the volume of fluid which enters a zone. This fluid may be different from the eluent in the strict sense, but it contributes to the displacement of the products in each column of the zone. This is called the mobile phase volume associated with each zone. The preferred configuration of the zones in the chromatographic system is described in more detail hereafter.

In certain advantageous embodiments, the chromatographic system comprises sequencing members of the injection and collection lines. In particular, the sequencing of these injection and collection lines takes place over an operating cycle of the system. In the present application, an "operating cycle" or "cycle" designates the time at the end of which the injection and collection lines have been sequenced until they return to their initial position in the system. At the end of a cycle, the system is back to its original configuration. A cycle generally comprises as many "periods" as columns. Thus the cycle of a method implemented on an 8-column system is composed of 8 successive periods.

The unit BV ("Bed Volume") makes it possible to measure the volume of mobile phase flowing in each zone (or injected eluent, or of injected feedstock to be treated), relative to the volume of stationary phase bed in a column. The measurement of these volumes is per period.

The stationary phase used in the invention may be an anionic, strong or weak cationic resin, or a mixture thereof, having a particle size (Dv50) comprised between 100 and 600 µm, preferably between 170 and 400 µm. The chromatographic purification of the invention is implemented in a multicolumn chromatographic system. Preferably, the chromatographic system comprises from 4 to 10 columns.

Preferably, the chromatographic purification of the invention is carried out continuously.

Preferably, the chromatographic purification of the invention is a periodic chromatographic accumulation method.

By "accumulation method" is intended to mean a chromatographic method in which the injection of the mixture to be separated (starting flow) is intercalated or added to a non-zero concentration profile passing from the outlet to the inlet of a column.

Examples of such accumulation methods are AMB, SMB, VariCol, Powerfeed, ModiCon, iSMB or SSMB methods.

The simulated moving bed (or SMB for "simulated moving bed") method is a continuous multicolumn method, the injection of the mixture to be separated being carried out over an entire cycle.

The SMB method may, notably, be a four-zone SMB method. In this case, the system comprises a set of columns connected in series and closed loop, the output of a column being connected to an inlet of the next column. The system comprises at least one injection line for the mixture to be separated, a collection line of a raffinate, an injection line of an eluent and a collection line of an extract. The injection lines (flow and eluent) and the collection lines of the fractions are displaced periodically and synchronously (synchronous sequencing) within the loop in the direction of the flow of the fluid circulating through the loop. The duration between two offsets of the assembly of the injection and collection lines of a column corresponds to a period; at the end of a cycle all the points have returned to their initial position system having a cyclic operation. A cycle has as many periods as columns.

An AMB system (or "actual moving bed") has a similar operation to an SMB system. However, instead of moving the injection points of the feed and eluent flow, as well as collection points, by means of a valve system, an assembly of adsorption units (columns) are moved physically relative to the feeding and collection points. Again, the operation makes it possible to simulate a continuous moving bed against the current.

The chromatographic purification of the invention may be a continuous injection method of the mixture to be separated (i.e. a method in which the injection of the mixture to be separated is a continuous flow). The injection of the mixture to be separated is thus carried out throughout the cycle. The chromatographic purification of the invention may also be a quasi-continuous injection method of the mixture to be separated.

Alternatively, the chromatographic purification of the invention may be a method in which the injection of the mixture to be separated (starting flow) is discontinuous. In these methods, the injection of the mixture to be separated is not carried out over an entire cycle, but for a total duration of less than one cycle. As a discontinuous injection method mixture to separate the iSMB method ("improved simulated moving bed"), described in documents EP 0342629 and U.S. Pat. No. 5,064,539, to which reference is expressly made. In this method, in one step the system operates in a closed loop, without injection or product collection.

The sequential SMB or SSMB (simulated sequential moving bed) method is another preferred example. An SSMB system cuts introductions and collections of the flows into sub-sequences applied in periodic ways. An SSMB system is, for example, described in the document WO 2015/104464.

Preferably, the chromatographic purification of the invention is a method of the SSMB type.

The chromatographic system preferably comprises zones 1, 2, 3 and 4: zone 1 is located between an injection line of an eluent and a collection line of the extract; zone 2 is located between the collection line of the extract and an injection line of the mixture to be separated; zone 3 is located between the injection line of the mixture to be separated and a collection line of the raffinate; and zone 4 is located between the collection line of the raffinate and the injection line of an eluent.

Figure 1:
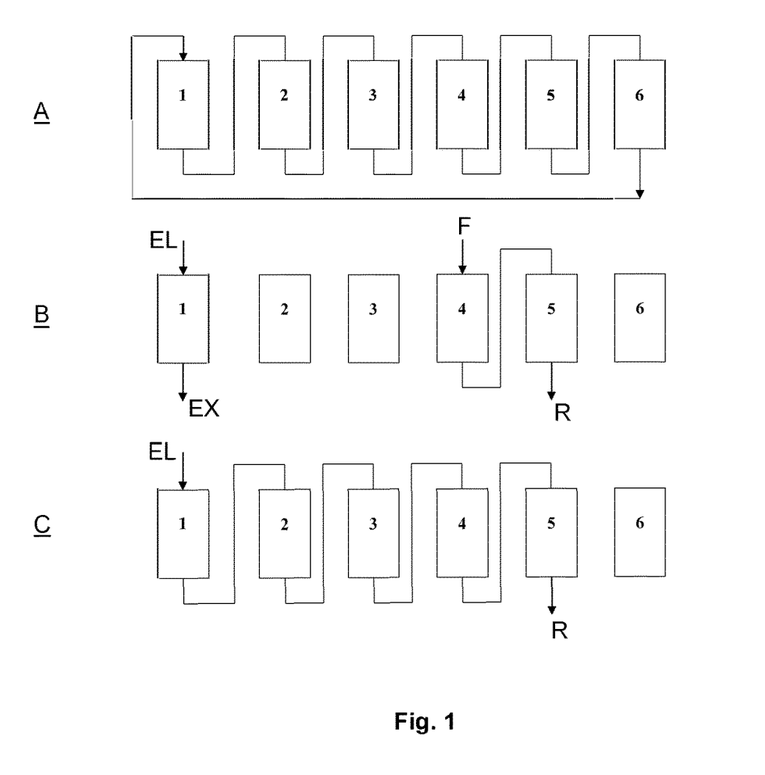
FIG. 1 schematically shows an SSMB chromatographic system that may be used to implement the method of the invention.

A possible example of an SSMB system that may be used in the invention is shown with reference to FIG. 1. In this example, six cells or columns are used. This system may be operated according to a cyclic operation in four phases.

Phase 1 (part A of the figure): loop phase, during which a continuous closed loop circulation is maintained on all the cells placed in series, to displace the interstitial volume of one cell to the next, without the injection of eluent. The skilled in the art will note that the volume of mobile phase displaced in this phase contributes to zones 1, 2, 3 and 4.

Phase 2 (part B of the figure): feedstock/feedstock injection. The feedstock flow (F) is injected at the top of the fourth cell. Simultaneously, a substantially identical volume of raffinate (R) is collected at the outlet of the fifth cell. The cells 4 and 5 here constitute zone 3. The cells 2 and 3 constitute the separation zone between the extract and the feedstock injection. They constitute zone 2 here. The skilled in the art will note that the volume of mobile phase displaced in this phase contributes to zone 3.

Phase 3 (part B of the figure): elution of the extract. The eluent (EL) is injected onto the first cell to elute the extract (EX), which is collected in a substantially identical volume at the bottom of the first cell. The cell No. 1 here constitutes zone 1. The skilled in the art will note that the volume of mobile phase displaced in this phase contributes to zone 1.

Phases 2 and 3 are preferably operated simultaneously to increase the productivity of the system.

Phase 4 (part C of the figure): elution of the raffinate. The eluent (EL) is injected at the top of the first cell, and the raffinate (R) is collected in substantially identical volume out of the fifth. Cell No. 6 is here a buffer cell allowing to ensure the separation between the tail of the extract and the head of the raffinate. It constitutes zone 4. This zone may be omitted in the case where the degree of purity and/or the desired yield is relatively limited. The skilled in the art will note that the volume of mobile phase displaced in this phase contributes to zones 1, 2 and 3.

These phases are operated in the order from 1 to 4 in a preferred embodiment. Their sequence constitutes a complete sequence (also called period).

Each sequence (phases 1 to 4) is repeated six times by shifting the cell inlets and outlets by incrementing the cell number, from the left to the right of the system: the feedstock is thus injected at the top of cell No. 1 in sequence No. 1, then at the top of cell No. 2 in sequence No. 2, etc.

A complete production cycle is carried out after completion of the six successive sequences, when the injection point of the feedstock, initially at the inlet of cell No. 1, returns again to the inlet of cell No. 1.

In the foregoing, a description of the SSMB system has been given with reference to the case where the cells correspond to columns. This is not limiting, and the invention also applies to systems in which the cells, or even compartments, are parts of the column.

Moreover, the number of columns present in zones 1, 2, 3 and 4 may vary according to the desired quality of separation. Therefore, systems of the same type with a cell, two cells, three cells, four cells, five cells, six cells, and up to twelve cells or more may also be designed.

The columns may have notably a length of 1 to 2.6 m, namely: from 1.0 to 1.2 m, or from 1.2 to 1.4 m, or from 1.4 to 1.6 m, or from 1.6 to 1.8 m, or from 1.8 to 2.0 m, or from 2.0 to 2.2 m, or from 2.2 to 2.4 m, or from 2.4 to 2.6 m; a range of 1.4 to 2.0 m is considered preferable. The length in question is the useful length of the column, corresponding to the height of the stationary phase bed in the column.

As described above and as illustrated in the examples below, the invention makes it possible to improve the performance of the chromatographic installation. However, performance losses may be encountered during a change of scale of the installation. In particular, when the diameter of the columns exceeds about one meter in diameter, it may be crucial to control the dead volumes.

The dead volumes correspond to the total (internal) volume of the "intercolumn fluidic links", i.e. the links between the output or outputs of a column and the input or inputs of the next column. Any element located between two successive columns, such as a pipe (or conduit), a valve or a pump, belongs to the intercolumn fluidic links. Volumes found after a collection valve of an extract or raffinate, or before injection valves are not considered as dead volumes (volumes located between the chromatography system and storage tanks for the feedstock to be injected, eluent, extract and raffinate).

It is advantageous for the velocity of the fluids flowing in the inter-column fluidic connections, and, in particular, in the pipes or conduits thereof, to exceed 0.5 m/s, preferably 1 m/s and more preferably 1.5 m/s. The fluid velocity considered here is the average velocity (flow divided by the cross section).

The control of the velocity in the inter-column fluidic links is carried out, for example, by adjusting the diameter of these links for a given flow rate.

When treating a relatively viscous mixture to be separated, using relatively small fluidic connection diameters leads to an increase in the velocity of the fluids, but also in the pressure in the installation. Therefore, the search for a good fluid velocity/fluid viscosity pair requires optimization work. In the context of the purification of fructose, as described above, it has been found that the fluid velocities indicated above are adequate.

It is also advantageous if the total volume of the intercolumn fluidic links is less than 10% of the total volume of the columns, preferably less than 5%, or even 3% of the total volume of the columns. This makes it possible to avoid a drop in the performance of up to one or two points of purity or efficiency. The adjustment of these dead volumes may be carried out by minimizing the total length of the intercolumn fluidic links (notably pipes or conduits).

Preferably, the fluid velocity and dead volume values above are associated with columns having a diameter greater than or equal to 1 m (useful diameter, or diameter of the stationary phase bed in the columns).

Setting the Chromatographic Purification

The fluid flow rates in the different columns of the chromatographic system may be adjusted in order to obtain the following operating parameters.

The ratio of the mass flow rate of eluent to the mass flow rate of dry matter of the extract may be from 0.5 to 0.6; or from 0.6 to 0.7; or from 0.7 to 0.8; or from 0.8 to 0.9; or from 0.9 to 1.0; or from 1.0 to 1.1; or from 1.1 to 1.2; or from 1.2 to 1.3. Ranges of 0.5 to 1.3, especially 0.6 to 1.2, are examples of preferred ranges.

The injected volume of eluent may notably be from 0.12 to 0.14 BV; or from 0.14 to 0.16 BV; or from 0.16 to 0.18 BV; or from 0.18 to 0.20 BV; or from 0.20 to 0.22 BV; or from 0.22 to 0.24 BV; or from 0.24 to 0.26 BV; or from 0.26 to 0.28 BV. High volumes of eluent are sometimes used industrially in the case where the resin is aging and where the interest of the production requires to continue to produce; the eluent volumes are thus higher than those obtained in the laboratory.

The volume of feedstock to be treated may notably be from 0.08 to 0.10 BV; or from 0.10 to 0.12 BV; or from 0.12 to 0.14 BV; or from 0.14 to 0.16 BV; or from 0.16 to 0.18 BV; or from 0.18 to 0.20 BV; or from 0.20 to 0.22 BV; or from 0.22 to 0.24 BV; or from 0.24 to 0.26 BV.

The chromatographic purification is preferably carried out at a temperature (called operating temperature) greater than or equal to 50° C.; and, notably, from 50 to 53° C.; or from 53 to 55° C.; or from 55 to 58° C., or from 58 to 60° C.; or from 60 to 62° C.; or from 62 to 65° C.; or from 65 to 70° C. A temperature of about 60° C. is an example of a particularly suitable operating temperature. The above operating temperature corresponds to the average temperature of the mobile phase in the chromatographic system.

Mixture to be Separated

The mixture to be separated is a composition comprising a product of interest (in this case fructose) and at least one impurity in a solvent. Preferably the solvent is water or an aqueous solution. Preferably, glucose is present as an impurity.

In some particularly advantageous embodiments, the mixture to be separated comprises glucose and fructose; preferably, the extract is enriched in fructose (and depleted in glucose) and the raffinate is enriched in glucose (and depleted in fructose).

The dry matter mass concentration of the mixture to be separated is from 45 to 55%, and more particularly: from 45 to 46%, or from 46 to 47%, or from 47 to 48%, or from 48 to 49%, or from 49 to 50%, or from 50 to 51%, or from 51 to 52%, or from 52 to 53%, or from 53 to 54%, or from 54 to 55%. A concentration of about 50% is particularly suitable.

In general, the dry matter mass concentration of a composition corresponds to the mass of dry matter of the composition based on the total mass thereof. The dry matter mass concentration is approximately equal to the sugar content in Brix degrees.

In some embodiments, the dry matter mass concentration of the mixture to be separated is adjusted by concentration (notably evaporation) or by dilution (by addition of solvent, preferably water) prior to injection, in order to work in the above-defined ranges.

In some embodiments, the mixture to be separated contains the following mass proportions (relative to the dry matter):
- from 40 to 65%, preferably from 45 to 60%, more preferably from 50 to 55% and, for example, approximately 53% of glucose; and/or
- from 30 to 55%, preferably from 35 to 50%, more preferably from 40 to 45% and, for example, approximately 42% of fructose; and/or
- from 1 to 10%, preferably from 3 to 8%, more preferably from 4 to 6% and, for example, about 5% of polysaccharides.

In general, the mixture to be separated may, notably, be any feedstock (preferably of industrial origin) containing fructose and at least one other sugar, such as glucose.

The mixture to be separated may, notably, be obtained by isomerization and/or hydrolysis from a glucose and/or sucrose composition. The composition of glucose and/or sucrose may, notably, come from a step of saccharification of a raw material such as corn, wheat, potato, sugar cane, fruit or other raw vegetable materials. The mixture to be separated may also come from a mother liquor crystallization from a line of crystallized sugar.

Concentration steps by evaporation and/or demineralization may be provided to obtain the mixture to be separated.

The invention may be more particularly applied to the production of a fructose composition from an initial composition comprising glucose.

First Method for Producing a Fructose Composition

Figure 2:
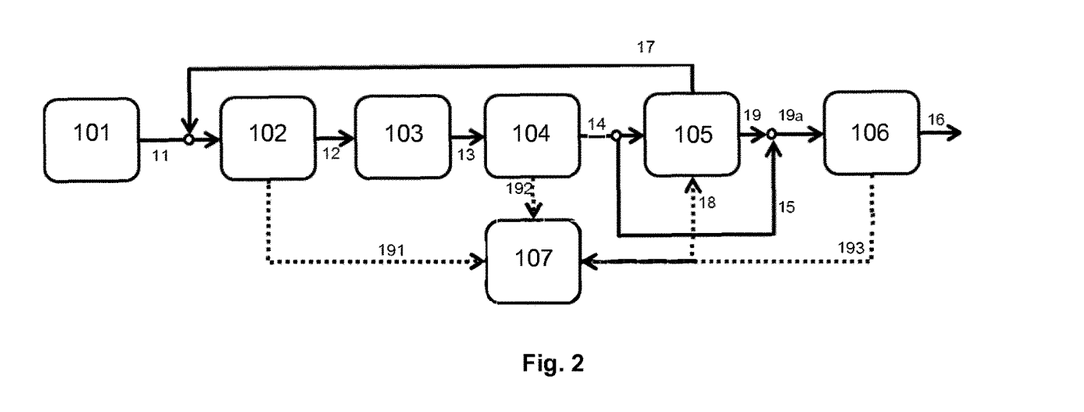
FIG. 2 schematically shows an installation for producing fructose, in some embodiments.

Making reference to FIG. 2, an installation for implementing a first method for producing a fructose composition may, for example, comprise the following elements:
- a source 101 of initial composition comprising glucose;
- a first evaporator 102 fed by a feed line of initial composition comprising glucose 11 originating from the source 101 of initial composition comprising glucose;
- a collection line of concentrated initial composition 12 at the outlet of the first evaporator 102;
- an isomerization reactor 103 fed by the collection line of concentrated initial composition 12;
- a collection line of intermediate composition 13 at the outlet of the isomerization reactor 103;
- a second evaporator 104 supplied by the collection line of intermediate composition 13;
- a concentrated intermediate composition collection line of concentrated intermediate composition 14 at the outlet of the second evaporator 104;
- a multicolumn chromatography system 105 (as described above) fed by the collection line of concentrated intermediate composition 14 as well as by a line of eluent 18;
- a collection line of extract 19 and a collection line of raffinate 17 from the multicolumn chromatography system 105, the raffinate collection line 17 optionally ensuring recycling towards the feed line of initial composition 11;
- a third evaporator 106 fed by a feed line 19a, that is itself fed by the collection line of extract 19;
- a collection line of fructose composition 16 at the outlet of the third evaporator 106;
- a first purge line 191, a second purge line 192 and a third purge line 193 at the respective outlets of the first evaporator 102, the second evaporator 104 and the third evaporator 106; and
- optionally, a bypass line of concentrated intermediate composition 15, coming from the collection line of concentrated intermediate composition 14 and feeding directly the feed line 19a (in combination with the collection line of extract 19) upstream of the third evaporator 106. Alternatively, one or more intermediate devices may be arranged on line 15. By way of example, a buffer tank may be provided for storing the intermediate composition.

Thus, according to this method, an initial composition comprising glucose first undergoes a concentration step in the first evaporator 102, at the end of which a concentrated initial composition is recovered. This is brought to the isomerization reactor 103, in which part of the glucose is converted to fructose in an isomerization step. At the outlet of the isomerization reactor 103, a so-called intermediate composition is recovered. This intermediate composition undergoes a concentration step in the second evaporator 104, at the end of which a concentrated intermediate composition is recovered. This is brought to the multicolumn chromatographic system 105, which is separately eluent fed, i.e. water.

A chromatographic purification is carried out in the multicolumn chromatographic system 105, at the output of which an extract and a raffinate are recovered. This purification may be carried out as described above, the concentrated intermediate composition constituting the mixture to be separated.

The raffinate is enriched in glucose relative to the intermediate composition, while the extract is enriched in fructose. The raffinate may be recycled by combining it with the initial composition before the first concentration step.

The extract may be combined with a portion of the concentrated intermediate composition to adjust the fructose concentration to a desired level and then this flow is subjected to a concentration step in the third evaporator 106, at the end of which the desired fructose composition is recovered. This is particularly useful when it is desired to obtain a low final purity in fructose (e.g. composition of the type HFS 55).

Alternatively, and contrary to what is illustrated in the figure, the extract may be directly subjected to the concentration step in the third evaporator 106, at the end which the desired fructose composition is recovered, without combining it with another flow. This is particularly useful when it is desired to obtain a high final purity in fructose (e.g. composition of the type HFS 95).

In the context of the production of high purity fructose, the bypass line of intermediate composition 15 of FIG. 2 may be omitted and the collection line of raffinate 17 may allow recycling to saccharification and/or demineralization units upstream of the source 101. In order to avoid a concentration of polysaccharides due to this recycling, a nanofiltration unit or a chromatographic separation unit may be placed on this collection line of raffinate 17, for example in order to eliminate the polysaccharides.

Water 107 is recovered from the first purge line 191, the second purge line 192, and the third purge line 193, and may be used as eluent source for the multicolumn chromatographic system 105 or any other source of water that may be used in the installation or nearby unit operations.

Second Method for Producing a Fructose Composition

Since the invention provides for working with a mixture to be separated having a dry matter mass concentration of 45 to 55%, the invention makes it possible to eliminate the concentration step between the isomerization and the chromatographic purification, and therefore the elimination of the second evaporator. The third evaporator in the above method then preferably becomes the second evaporator in the second method. Preferably, the installation thus contains only these two evaporators (and the corresponding method comprises only the two corresponding evaporation steps).

Figure 3:
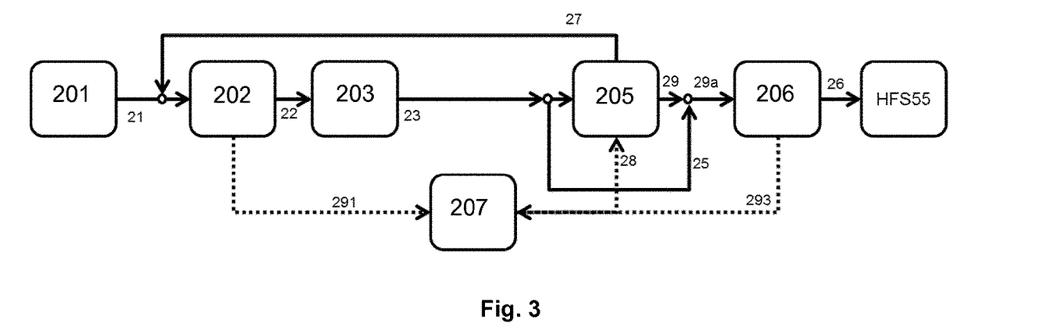
FIG. 3 schematically shows an installation for producing fructose, in other embodiments.

Thus, making reference to FIG. 3, an example of an installation for implementing the second method for producing a fructose composition may comprise the following elements:

- a source 201 of initial composition comprising glucose;
- a first evaporator 202 fed by a feed line of initial composition comprising glucose 21 coming from the source 201 of initial composition comprising glucose;
- a collection line of concentrated initial composition 22 at the outlet of the first evaporator 202;
- an isomerization reactor 203 fed by the collection line of concentrated initial composition 22;
- a collection line of intermediate composition 23 at the outlet of the isomerization reactor 203;
- a multicolumn chromatography system 205 (as described above) fed by the collection line of intermediate composition 23 as well as by a line of eluent 28;
- a collection line of extract 29 and a collection line of raffinate 27 from the multicolumn chromatography system 205, the collection line of raffinate 27 optionally providing recycling towards the feed line of initial composition 21;
- a second evaporator 206 fed by a feed line 29a that is itself fed by the collection line of extract 29;
- a collection line of fructose composition 26 at the outlet of the second evaporator 206;
- a first purge line 291 and a second purge line 293 respectively output from the first evaporator 202 and the second evaporator 206; and
- optionally, a bypass line of intermediate composition 25 coming from the collection line of intermediate composition 23 and directly feeding the feed line 29a (in combination with the collection line of extract 29) upstream of the second evaporator 206. Alternatively, one or more intermediate devices may be arranged on the line 25. By way of example, a buffer tank may be provided for storing the intermediate composition.

Thus, an initial composition comprising glucose first undergoes a concentration step in the first evaporator 202, at the end of which a concentrated initial composition is recovered. This is brought to the isomerization reactor 203, wherein part of the glucose is converted to fructose, in an isomerization step. The isomerization of glucose to fructose is not complete. At the outlet of the isomerization reactor 203, a so-called intermediate composition is recovered. This is brought to the multicolumn chromatographic system 205, which is separately fed by eluent, i.e. water.

A chromatographic purification is carried out in the multicolumn chromatographic system 205, at the outlet of which an extract and a raffinate are recovered. The raffinate is enriched in glucose relative to the intermediate composition, while the extract is enriched in fructose. The raffinate is optionally recirculated by combining it with the initial composition before the first concentration step.

The extract may be combined with a part of the intermediate composition in order to adjust the fructose concentration to a desired content, and then this flow is subjected to a concentration step in the second evaporator 206, at the end of which the desired fructose composition is recovered. This is particularly useful when it is desired to obtain a low final purity in fructose (e.g. composition of the type HFS 55).

Alternatively, and contrary to what is shown in the figure, the extract may be directly subjected to the concentration step in the second evaporator 206, at the end of which the desired fructose composition is recovered, without combining it with another flow. This is particularly useful when it is desired to obtain a high final purity in fructose (e.g. composition of the type HFS 95).

In the context of the production of high purity fructose, the bypass line of intermediate composition 25 of FIG. 3 is eliminated and the collection line of raffinate 27 may allow recycling towards saccharification and/or demineralization units upstream of the source 201. In order to avoid the concentration of the polysaccharides due to this recirculation, a nanofiltration unit or a chromatographic separation unit may be placed on this collection line of raffinate 27, for example, in order to eliminate the polysaccharides.

Water 207 is recovered from the first purge line 291 and the second purge line 293. This recovered water may be used as the eluent source for the multicolumn chromatographic system 205; alternatively, fresh water may be used in whole or in part for the eluent.

Preferably, a demineralization step (not shown in the figure) may be carried out between the isomerization step 203 and the chromatography step 205. The demineralization system thus comprises columns filled with ion exchange resin, cationic and/or anionic, as a stationary phase.

Preferably, in the first method as in the second method, a step of removing the residual color of the extract (or discoloration) is carried out prior to the concentration of the extract in the third evaporator 106, respectively the second evaporator 206. This may be carried out by arranging a discoloration unit (not shown in the figure) between the multicolumn chromatography system 105, 205 and the evaporator 106, 206 downstream thereof. The discoloration may comprise the passage of the extract flow on a cationic and/or anionic ion exchange resin and/or on a bed of activated carbon in the form of powder or grains. Sterile filtration may be associated with this step.

The evaporators 102, 104, 106, 202, 206 may be plate or tubular, single effect or multiple effects, single pass or recirculation, steam or mechanical recompression of steam, with or without thermocompressor.

The isomerization reaction is preferably an enzymatic reaction. An enzyme such as isomerase is put in contact with the product in a reactor, preferably at a temperature between 50 and 60° C., preferably at a pH between 7 and 8. Enzymes such as Novozymes Sweetzyme® or Gensweet® from Genencor are used for this operation.

The method is preferably continuous.

In the second method, the intermediate composition obtained at the end of the isomerization step does not undergo a concentration step by evaporation of water prior to the chromatographic purification step. In other words, no evaporator is provided between the isomerization reactor 203 and the multicolumn chromatography system 205.

It is possible that the collection line of intermediate composition 23 directly connects the isomerization reactor 203 to the multicolumn chromatography system 205 without any intermediate devices. Alternatively, one or more intermediate devices may be arranged between the isomerization reactor 203 and the multicolumn chromatography system 205. By way of example, a buffer tank may be provided for storing the intermediate composition.

Preferably, in the second method, the dry matter mass concentration of the intermediate composition at the inlet of the multicolumn chromatographic system 205 is equal to the dry matter mass concentration of the intermediate composition at the outlet of the isomerization reactor 203, if necessary within ±5%, or within ±4%, or within ±3%, or within ±2%, or within ±1%, or exactly.

The above tolerance is expressed as percentages of dry matter. To take an example, if a composition has a dry matter mass concentration of 50% within ±5%, it means that the composition has a dry matter mass concentration of 45 to 55%.

It is possible, for example, to envisage a slight dilution of the intermediate composition before the multicolumn chromatography system 205, for example by a supply of water. However, it is preferred for more simplicity that no active adjustment of the dry matter mass concentration of the intermediate composition is carried out between the isomerization reactor 203 and the multicolumn chromatographic system 205.

Compositions Involved in the Methods for Producing Fructose Composition of the Invention The initial composition used in the first method and in the second method above comprises glucose. It is preferably an aqueous composition. It is preferably a glucose syrup with a high dextrose level. It preferably has a dry matter mass concentration from 25 to 35%, preferably from 28 to 33%, and more preferably about 31%.

The initial composition used in the above methods preferably contains a mass proportion of glucose (relative to dry matter) greater than or equal to 50%, or 80%, or 90%. More preferably, it contains a mass proportion of glucose of approximately 95%. Preferably, the rest of the dry matter is mainly composed of polysaccharides.

After the concentration step, the concentrated initial composition is obtained. It has essentially the same composition in sugars as the initial composition, but it has a higher dry matter mass concentration, for example from 40 to 58%, preferably from 45 to 55%, more preferably from 48 to 52%, and more preferably about 50%.

The intermediate composition, which is obtained at the end of the isomerization, also comprises a dry matter mass concentration, for example from 40 to 58%, preferably from 45 to 55%, more preferably from 48 to 52%, and more preferably about 50%. Preferably, the dry matter mass concentration of the intermediate composition at the end of the isomerization is substantially identical to the dry matter mass concentration of the concentrated initial composition.

During the isomerization step, part of the glucose is converted to fructose. In some embodiments, the intermediate composition contains a mass proportion of glucose (relative to the dry matter) from 40 to 65%, preferably from 45 to 60%, more preferably from 50 to 55% and, for example, about 53%. In some embodiments, the intermediate composition contains a mass proportion of fructose (relative to the dry matter) from 30 to 55%, preferably from 35 to 50%, more preferably from 40 to 45% and, for example, about 42%. In some embodiments, the intermediate composition contains a mass proportion of polysaccharides (based on dry matter) from 1 to 10%, preferably 3 to 8%, more preferably 4 to 6%, and, for example, about 5%.

At the end of the chromatographic purification, a fructose-enriched extract is obtained and thus depleted in glucose and a glucose-enriched raffinate and thus depleted in fructose.

In some embodiments, the recovered fructose composition (obtained after concentrating the extract in the collection line of fructose composition 26) has a dry matter mass concentration of at least 75%, preferably of at least 76%, for example about 77%.

In some embodiments, the recovered fructose composition contains a mass proportion of glucose (based on dry matter) from 35 to 48%, preferably from 38 to 45%, more preferably from 39 to 42%, for example about 40%. In some embodiments, the recovered fructose composition contains a mass proportion of fructose (based on dry matter) from 50 to 60%, preferably from 52 to 58%, more preferably from 54 to 56%, for example about 55%. In some embodiments, the recovered fructose composition contains a mass proportion of polysaccharides (based on dry matter) from 2 to 8%, preferably from 3 to 7%, more preferably from 4 to 6%, for example about 5%.

In other embodiments, the recovered fructose composition contains a mass proportion of fructose (relative to dry matter) greater than or equal to 95%, preferably 96%, more preferably 97%, more preferably 98%, more preferably 98.5%.

Preferably, at least 80% by mass of the fructose contained in the mixture to be separated is recovered in the extract, more preferably at least 90% by mass.

EXAMPLES

The following examples illustrate the invention without limiting it. In all the examples, a chromatographic purification system of the SSMB type was used. The system comprises of four columns filled with Novasep Process resin XA2004-30Ca or XA2004-31Ca as a stationary phase, over a bed height of two meters in each column.

The respective volumes of mobile phase in zones 1, 2, 3 and 4 are denoted by $BV_1$, $BV_2$, $BV_3$ and $BV_4$. In the examples below, the volume of eluent (denoted $BV_{water}$ and equal to $BV_1-BV_4$) is adjusted in a range from 0.11 to 0.25. The volume of feedstock to be treated (denoted $BV_{feed}$ and equal to $BV_3-BV_2$) is adjusted in a range from 0.11 to 0.30. The flow rates $BV_1$ and $BV_2$ are scanned in the following ranges: from 0.65 to 0.75 and from 0.55 to 0.65. The volumes $BV_3$ and $BV_4$ are calculated as follows: $BV_3=BV_2+BV_{feed}$ and $BV_4=BV_1-BV_{water}$.

The adjustments of $BV_1$ and $BV_2$ fluctuate from one system to another for reasons of stationary phase density variability. On the other hand, this variability does not have any impact on the performances due to the volume of water and the feedstock volume used.

Example 1 (Comparative)

This reference example is implemented from a mixture to be separated having a dry matter mass concentration of 50%, and further having the following characteristics: a mass proportion of glucose relative to the total dry matter of 53%, a mass proportion of fructose relative to the total dry matter of 42% and a mass proportion of polysaccharides relative to the total dry matter of 5%.

In this example, the chromatographic purification is carried out at a temperature of 65° C. The volume of eluent used $BV_{water}$ is 0.205 and the injected volume of the mixture to be separated $BV_{feed}$ is 0.145. The purity reached in fructose in the extract is 97.3% by mass, for a yield of 90% by mass.

Example 2 (Characterization of Fructose Degradation)

In a first step, three samples of fructose compositions were analyzed by analytical chromatography.

Figure 4:
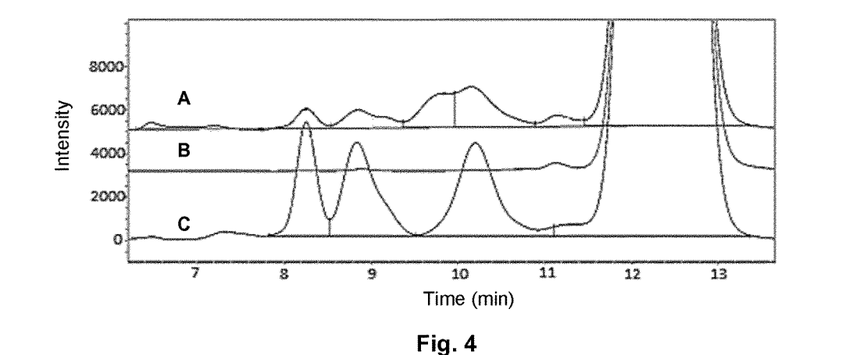
FIG. 4 is a superposition of three analytical chromatograms, as described in Example 2. The elution time is indicated on the abscissa, and the intensity is indicated in arbitrary units on the ordinate.

FIG. 4 shows analytical chromatograms obtained for the following three samples:
- A: fructose purified by an SSMB method whose feedstock is 50 Brix, and operating at 65° C. (as in Example 1);
- B: pure fructose syrup;
- C: pure fructose syrup after aging for 17 hours at 65° C.

The appearance on the chromatograms of similar impurities in samples A and C compared to sample B, is observed.

In a second step, the content of impurities in a pure fructose syrup was studied as a function of the concentration of this fructose syrup and as a function of the temperature to which the syrup is subjected.

Figure 5:
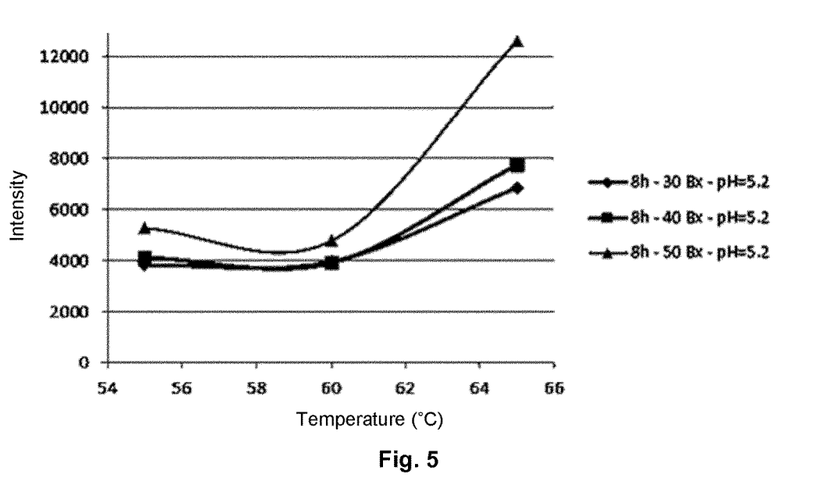
FIG. 5 illustrates the impurity content (in arbitrary units on the ordinate), as described in Example 2, in different samples of fructose as a function of the dry matter mass concentration and the applied temperature (on the abscissa).

More precisely, analytical chromatograms were obtained for different samples submitted for 8 hours at temperatures of 55, 60 and 65° C. and at a concentration of 30, 40 or 50 Brix degrees. The total area of the impurities was measured for each chromatogram obtained. The results are shown in FIG. 5.

It is found that the thermal degradation is accelerated when the concentration of the composition is high. In addition, degradation control is better if the applied temperature is below 65° C.

Example 3 (Invention)

This reference example is implemented from a mixture to be separated having a dry matter mass concentration of 50%, and further having the following characteristics: a mass proportion of glucose relative to the total dry matter of 53%, a mass proportion of fructose relative to the total dry matter of 42%, and a mass proportion of polysaccharides relative to the total dry matter of 5%.

In this example, the chromatographic purification is carried out at a temperature of 60° C. The volume of eluent used $BV_{water}$ is 0.205 and the injected volume of the mixture to be separated $BV_{feed}$ is 0.15. The purity reached in fructose in the extract is 98.5% by mass, for a yield of 92% by mass.

It was observed under these conditions that the volume of zone 4 should be adjusted in order to obtain a polysaccharide yield of 70%, preferably 75%, preferably 80% in the raffinate. The BV of zone 4 is thus preferably less than 0.56, preferably less than 0.54.

Under the conditions of Example 3, the use of stationary phase with a particle size of between 200 and 250 μm makes it possible to obtain higher yields of the order of 97%. The number of columns is advantageously between 4 and 6.

The invention claimed is:

1. A method for purifying a mixture to be separated containing fructose in a multicolumn chromatography system comprising a plurality of columns and intercolumn fluidic links, the method comprising successively and cyclically:
   a step of collecting a raffinate from the multicolumn chromatography system, a step of injecting the mixture to be separated containing fructose into the multicolumn chromatography system, a step of collecting an extract from the multicolumn chromatography system and a step of injecting eluent into the multicolumn chromatography system; wherein the method comprises moving a fluid through the intercolumn fluidic links at a velocity greater than 0.5 m/s;
   wherein the mixture to be separated containing fructose has a dry matter mass concentration of 45 to 55%, the method being carried out at a temperature of 50 to 62° C.;
   the injected volume of eluent is from 0.12 to 0.28 BV; and
   the extract contains a mass proportion of fructose, relative to the total dry matter, greater than or equal to 95%.

2. The method of claim 1, wherein the mixture to be separated containing fructose has a dry matter mass concentration of 48 to 52%.

3. The method of claim 1, which is implemented at a temperature of 55 to 60° C.

4. The method of claim 1, wherein at least 90% by mass of the fructose contained in the mixture to be separated containing fructose is recovered in the extract.

5. The method of claim 1, wherein the mixture to be separated containing fructose comprises polysaccharides, and wherein at least 70% by mass of the polysaccharides contained in the mixture to be separated containing fructose are recovered in raffinate.

6. The method of claim 1, wherein:
   the injected volume of eluent is from 0.12 to 0.22 BV; and/or
   the injected volume of mixture to be separated containing fructose is from 0.13 to 0.40 BV.

7. The method of claim 1, wherein:
   the volume of the intercolumn fluidic links is less than 10% of the total volume of the columns.

8. The method of claim 1, further comprising steps of
   supply of an initial composition;
   hydrolysis, isomerization, concentration by evaporation and/or demineralization of the initial composition to obtain the mixture to be separated containing fructose;
   concentration of the extract by evaporation of water; wherein the raffinate is a fructose-rich raffinate and the extract is a fructose-rich extract.

9. The method of claim 8, further comprising a step of removing residual color from the extract prior to the concentration step of the extract.

10. The method of claim 8, wherein the raffinate is recycled and added to the initial composition prior to the concentration step of the initial composition.

11. The method of claim 8, wherein:
   the extract contains a mass proportion of fructose, relative to the total dry matter, greater than or equal to 95%.

12. The method of claim 8, comprising a step of removing polysaccharides contained in the raffinate by nanofiltration or chromatographic purification, followed by recycling the raffinate towards the initial composition.

13. The method of claim 1, wherein the mixture to be separated containing fructose contains glucose.

14. The method of claim 13, wherein the mixture to be separated containing fructose comprises:
   a mass proportion of glucose relative to the total dry matter from 40 to 65%; and/or
   a mass proportion of fructose relative to the total dry matter from 30 to 55%.

15. The method of claim 8, wherein:
   the initial composition has a dry matter mass concentration of 25 to 35%; and/or
   the concentrated initial composition has a dry matter mass concentration greater than or equal to 40%; and/or
   the mixture to be separated containing fructose comprises at least 40% by mass of fructose relative to the total dry matter; and/or
   the extract after concentration has a dry matter mass concentration greater than or equal to 75%.

16. The method of claim 8, comprising injecting water as an eluent in the, multicolumn chromatography system, the ratio of mass flow rate of eluent to mass flow rate of dry matter of extract being from 0.5 to 1.3.

* * * * *

UNITED STATES PATENT AND TRADEMARK OFFICE
CERTIFICATE OF CORRECTION

PATENT NO. : 11,661,635 B2
APPLICATION NO. : 17/047681
DATED : May 30, 2023
INVENTOR(S) : Teddy Ebran and Guillaume Thibault Page 1 of 1

It is certified that error appears in the above-identified patent and that said Letters Patent is hereby corrected as shown below:

In the Claims

In Claim 1, Column 15, Line 66, delete "C.;" and insert -- C; --.

Signed and Sealed this
First Day of August, 2023

Katherine Kelly Vidal
Director of the United States Patent and Trademark Office